US 8,498,816 B2

(12) United States Patent
Miyamoto

(10) Patent No.: US 8,498,816 B2
(45) Date of Patent: Jul. 30, 2013

(54) SYSTEMS INCLUDING MOBILE DEVICES AND HEAD-MOUNTABLE DISPLAYS THAT SELECTIVELY DISPLAY CONTENT, SUCH MOBILE DEVICES, AND COMPUTER-READABLE STORAGE MEDIA FOR CONTROLLING SUCH MOBILE DEVICES

(75) Inventor: Yusuke Miyamoto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/612,262

(22) Filed: Sep. 12, 2012

(65) Prior Publication Data
US 2013/0006529 A1 Jan. 3, 2013

Related U.S. Application Data

(63) Continuation-in-part of application No. PCT/JP2011/062353, filed on May 30, 2011.

(30) Foreign Application Priority Data

Jun. 15, 2010 (JP) ................................. 2010-135911

(51) Int. Cl.
G01S 13/88 (2006.01)
(52) U.S. Cl.
USPC ............ 701/516; 701/400; 701/408; 701/409
(58) Field of Classification Search
USPC .................. 701/400, 408–409, 516
See application file for complete search history.

(56) References Cited

U.S. PATENT DOCUMENTS

| 8,380,427 | B2 * | 2/2013 | Taylor ........................... 701/409 |
| 2006/0069500 | A1 * | 3/2006 | Hashizume ................... 701/209 |
| 2007/0159390 | A1 * | 7/2007 | Kim ........................ 342/357.13 |
| 2008/0043020 | A1 * | 2/2008 | Snow et al. ................... 345/427 |
| 2008/0091654 | A1 * | 4/2008 | Kang et al. ........................ 707/3 |

(Continued)

FOREIGN PATENT DOCUMENTS

| JP | 2001-074493 A | 3/2001 |
| JP | 2003-165693 A | 6/2003 |

(Continued)

OTHER PUBLICATIONS

Japan Patent Office, Notice of Reasons for Rejection for Japanese Patent Application No. 2010-135911 (counterpart Japanese patent application), mailed May 7, 2013.

Primary Examiner — Hussein A. Elchanti
(74) Attorney, Agent, or Firm — Baker Botts L.L.P.

(57) ABSTRACT

A system includes a head-mountable display and a mobile device. The mobile device includes a position acquisition device that acquires positional information indicating a position of the mobile device. The mobile device includes a first orientation acquisition device that acquires first orientation information indicating an orientation of the mobile device with respect to a reference direction. The mobile device includes a first display that displays content based on the positional information and the first orientation information on the mobile device when a condition is satisfied. The mobile device includes a first receiver that receives second orientation information indicating an orientation of the head-mountable display with respect to one or more of the reference direction and the orientation of the mobile device. The mobile device includes a first transmitter that transmits content based on the positional information and the second orientation information when the condition is not satisfied.

18 Claims, 9 Drawing Sheets

U.S. PATENT DOCUMENTS

| | | | |
|---|---|---|---|
| 2008/0228393 A1* | 9/2008 | Geelen et al. | 701/208 |
| 2008/0319653 A1* | 12/2008 | Moshfeghi | 701/208 |
| 2009/0088970 A1* | 4/2009 | Kim | 701/208 |
| 2009/0225155 A1* | 9/2009 | Hirotani | 348/61 |
| 2010/0031186 A1* | 2/2010 | Tseng et al. | 715/786 |
| 2010/0045666 A1* | 2/2010 | Kornmann et al. | 345/419 |
| 2010/0177601 A1* | 7/2010 | Kim et al. | 368/14 |
| 2011/0301839 A1* | 12/2011 | Pudar et al. | 701/202 |

FOREIGN PATENT DOCUMENTS

| | | |
|---|---|---|
| JP | 2003-177033 A | 6/2003 |
| JP | 2004-101197 A | 4/2004 |
| JP | 2004-219664 A | 8/2004 |
| JP | 2005-069759 A | 3/2005 |
| JP | 2006-292616 A | 10/2006 |

\* cited by examiner

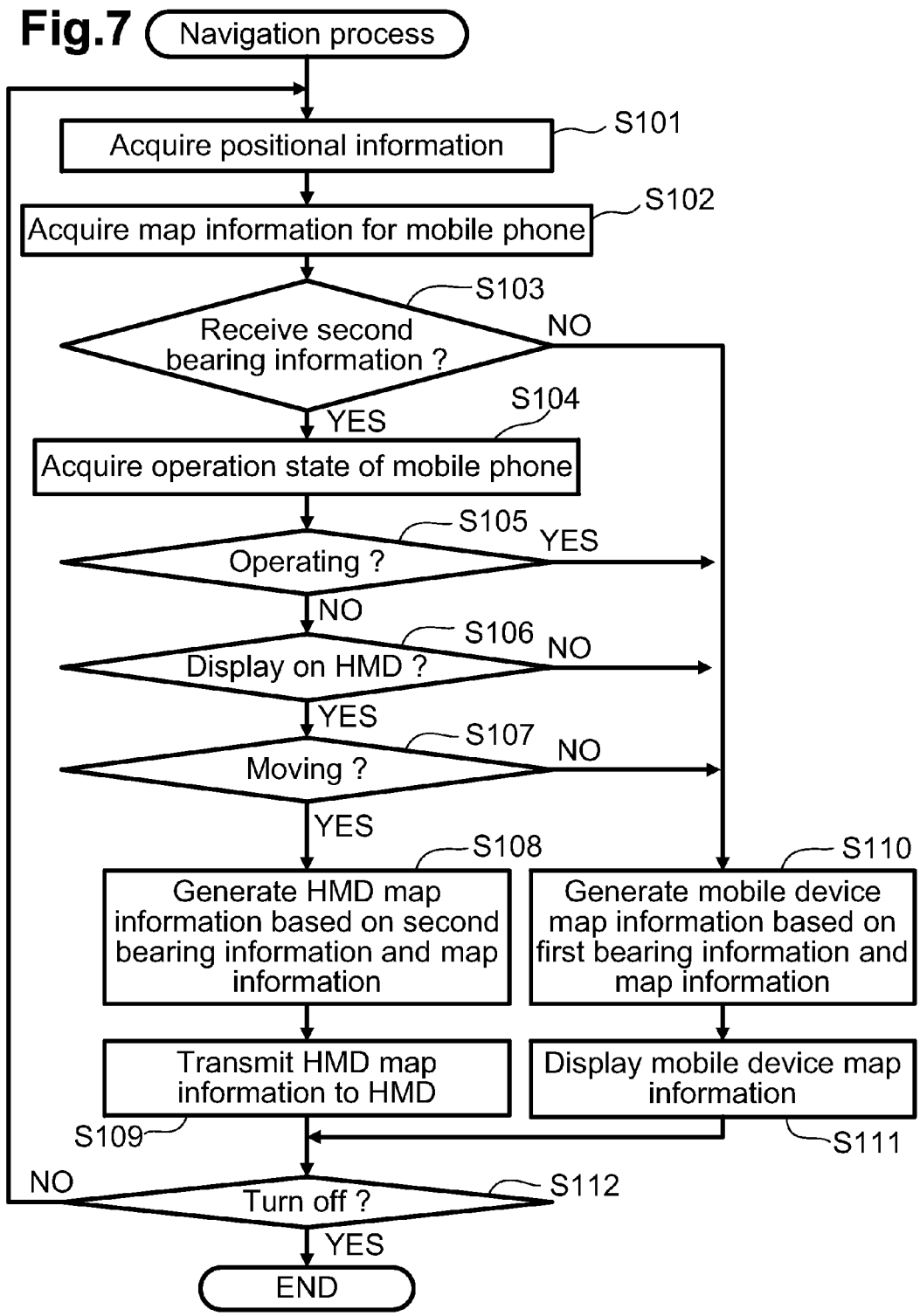

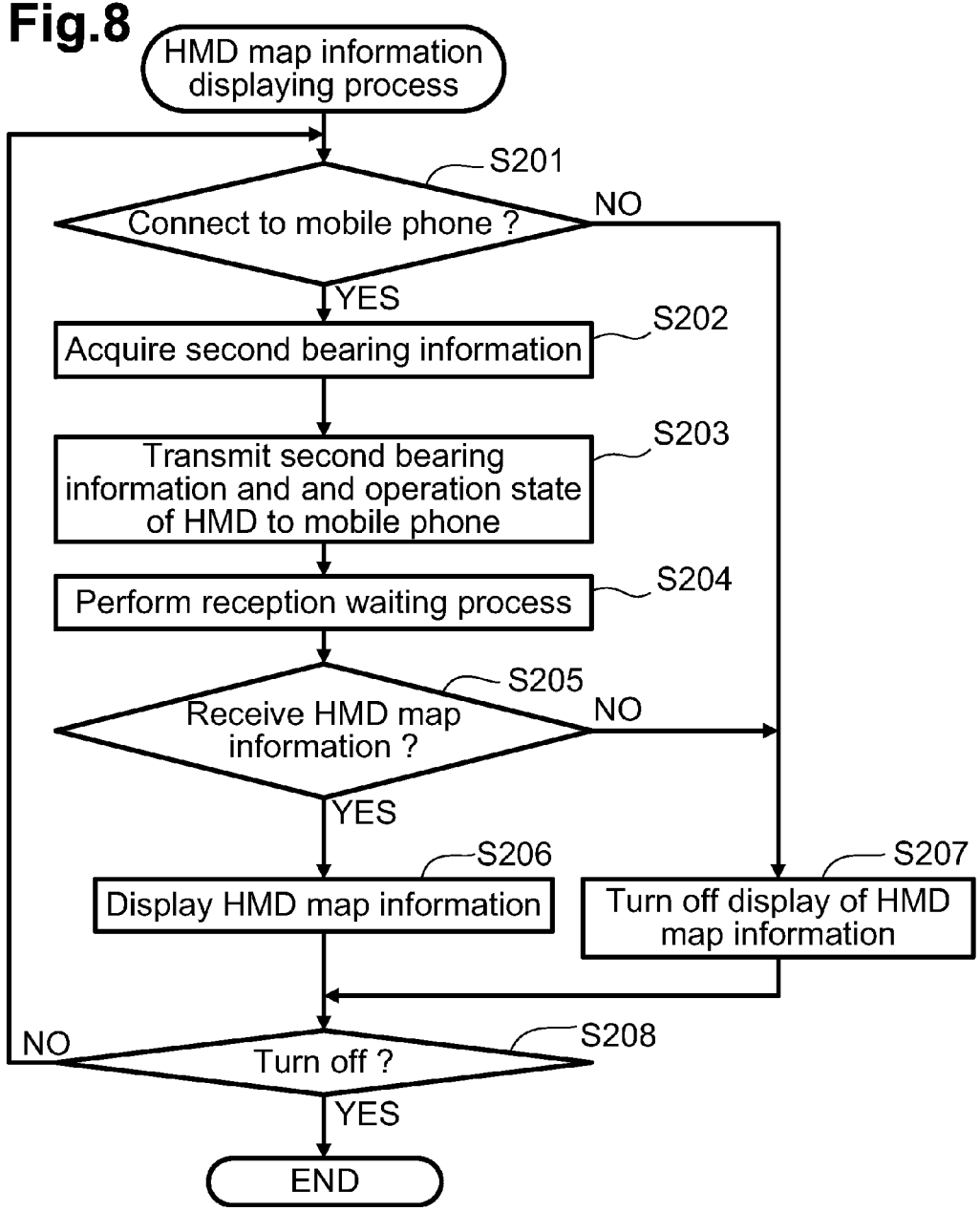

SYSTEMS INCLUDING MOBILE DEVICES AND HEAD-MOUNTABLE DISPLAYS THAT SELECTIVELY DISPLAY CONTENT, SUCH MOBILE DEVICES, AND COMPUTER-READABLE STORAGE MEDIA FOR CONTROLLING SUCH MOBILE DEVICES

CROSS-REFERENCE TO RELATED APPLICATIONS

This application is a continuation-in-part of International Patent Application No. PCT/JP2011/062353, filed on May 30, 2011, which claims the benefit of Japanese Patent Application No. 2010-135911, filed on Jun. 15, 2010, the disclosures of which are incorporated herein by reference.

BACKGROUND OF THE INVENTION

1. Field of the Invention

The present disclosure generally relates to displaying content on mobile devices and head-mountable displays, and more specifically to systems including mobile devices and head-mountable displays that selectively display content, such mobile devices, and non-transitory, computer-readable storage media storing instructions for controlling such mobile devices.

2. Description of Related Art

Known mobile devices, such as mobile phones, include compact liquid crystal displays ("LCDs"), which may serve as display devices. The mobile devices are functionally enhanced with one or more of a Global Positioning System ("GPS") function and a communication function for communicating via the Internet. The mobile devices acquire positional information by using the GPS function. In addition, the mobile devices acquire display content by using the communication function. The mobile devices are configured to display content related to their current positions on the LCDs, based on the positional information, such that the acquired content is put into practical use. The displayed content related to the positional information includes, for example, map information and information concerning surrounding facilities.

Mobile devices provided with bearing sensors are also known. The bearing sensors each detect an orientation of the mobile device. Content based on the detected orientation of the mobile devices is displayed on the LCDs in a user-friendly manner. For example, when the displayed content is map information, a function of aligning a direction of the mobile device with the upward direction of the map that is displayed is provided. When the display content is information concerning surrounding facilities, a function of extracting only the information about the direction of the mobile device and displaying the extracted information is provided. Nevertheless, a burden is imposed on the user when the user moves while visually recognizing the displayed content on the LCD of the mobile device.

A known head-mountable display displays sonic content similar to that displayed by the mobile device and may function as a display device. Specifically, a known technology displays the map information, which is the same as the displayed content displayed on the LCD of the mobile device, on the head-mountable display.

In addition, technologies to provide the hearing sensors in both mobile devices and headphones worn by the users on their heads are known. Specifically, a technology for varying an output condition of a musical sound based on a difference in orientation between the current bearing toward a destination and the current bearing of the head of the user is known. The technology further varies an output condition of a musical sound depending on a difference in orientation between the current bearing from an intermediate point that is not the current position toward the destination and the current bearing of the head of the user.

SUMMARY OF THE INVENTION

Only the difference in orientation between the current bearing from an intermediate point that is not the current position toward a destination or the difference in orientation between the current bearing toward the destination and the current bearing of the head of the user may be indicated to the user with the musical sound in the known technology. The map information, such as a route image, displayed on the LCD in the mobile device may be based on the bearing of the mobile device with respect to a set of reference directions (e.g., north, east, south, and west). Accordingly, when the head-mountable display is used as the display device, the map information may be based on the bearing of the mobile device with respect to the set of reference directions and may be displayed on the head-mountable display. Consequently, the map information displayed on the head-mountable device may not correspond to the current bearing of the front direction of the head of the actual user or the current bearing of the head-mountable device. The displayed map information may not be recognized by the user with the head-mountable display in such circumstances. To display the map information corresponding to the current bearing of the head of the user and the current bearing of the head-mountable device, the orientation of the reference directions displayed on the mobile device may be adjusted to match the current bearing of the front direction of the head of the user and the current bearing of the head-mountable device. In addition, the user may be required to use the mobile device while carrying the mobile device.

According to an embodiment of the disclosure, a system disclosed herein may comprise a head-mountable display and a mobile device. The mobile device may comprise a first processor and a first memory. The first memory may be configured to store first computer-readable instructions therein. The first computer-readable instructions may instruct the first processor to execute certain processes. The first computer-readable instructions may instruct the first processor to execute a process of acquiring positional information that indicates a position of the mobile device. The first computer-readable instructions may instruct the first processor to execute a process of acquiring first orientation information that indicates an orientation of the mobile device with respect to a reference direction. The first computer-readable instructions may instruct the first processor to execute a process of displaying content based on the positional information and the first orientation information on the mobile device when a particular condition is satisfied. The first computer-readable instructions may instruct the first processor to execute a process of receiving from the head-mountable display second orientation information that indicates art orientation of the head-mountable display with respect to one or more of the reference direction and the orientation of the mobile device. The first computer-readable instructions may instruct the first processor to execute a process of transmitting to the head-mountable display content based on the positional information and the second orientation information when the particular condition is not satisfied.

According to another embodiment of the disclosure, a mobile device disclosed herein may comprise a processor and a memory configured to store computer-readable instructions therein. The computer-readable instructions may instruct the processor to execute certain processes. The computer-readable instructions may instruct the processor to execute a process of acquiring positional information indicative of a position of the mobile device. The computer-readable instructions may instruct the processor to execute a process of acquiring first orientation information that indicates an orientation of the mobile device with respect to a reference direction. The computer-readable instructions may instruct the processor to execute a process of displaying content based on the positional information and the first orientation information on the mobile device when a particular condition is satisfied. The computer-readable instructions may instruct the processor to execute a process of receiving second orientation information that indicates an orientation of a head-mountable display with respect to one or more of the reference direction and the orientation of the mobile device. The computer-readable instructions may instruct the processor to execute a process of transmitting to the head-mountable display content based on the positional information and the second orientation information when the particular condition is not satisfied.

According to still another embodiment of the disclosure, a non-transitory, computer-readable storage medium disclosed herein may store computer-readable instructions thereon. When executed, the computer-readable instructions may instruct a mobile device to execute certain processes. The computer-readable instructions may instruct the mobile device to execute a process of acquiring positional information indicative of a position of the mobile device. The computer-readable instructions may instruct the mobile device to execute a process of acquiring first orientation information that indicates an orientation of the mobile device with respect to a reference direction. The computer-readable instructions may instruct the mobile device to execute a process of displaying content based on the positional information and the first orientation information on the mobile device when a particular condition is satisfied. The computer-readable instructions may instruct the mobile device to execute a process of receiving second orientation information that indicates an orientation of a head-mountable display with respect to one or more of the reference direction and the orientation of the mobile device. The computer-readable instructions may instruct the mobile device to execute a process of transmitting to the head-mountable display content based on the positional information and the second orientation information when the particular condition is not satisfied.

According to yet another embodiment of the disclosure, a system disclosed herein may comprise a head-mountable display and a mobile device. The mobile device may comprise a position acquisition device configured to acquire positional information that indicates a position of the mobile device. The mobile device may comprise a first orientation acquisition device configured to acquire first orientation information that indicates an orientation of the mobile device with respect to a reference direction. The mobile device may comprise a first display configured to display content based on the positional information and the first orientation information on the mobile device when a particular condition is satisfied. The mobile device may comprise a first receiver configured to receive from the head-mountable display second orientation information that indicates an orientation of the head-mountable display with respect to one or more of the reference direction and the orientation of the mobile device. The mobile device may comprise a first transmitter configured to transmit to the head-mountable display content based on the positional information and the second orientation information when the particular condition is not satisfied.

Other objects, features, and advantages will be apparent to persons of ordinary skill in the art from the following detailed description of embodiments of the invention and the accompanying drawings.

BRIEF DESCRIPTION OF THE DRAWINGS

For a more complete understanding of the present disclosure, needs satisfied thereby, and the objects features, and advantages thereof, reference now is made to the following descriptions taken in connection with the accompanying drawings.

FIG. 7 depicts a process executed in the mobile phone.

FIG. 8 depicts a process executed in the head-mountable display.

DESCRIPTION OF EMBODIMENTS OF THE INVENTION

Embodiments of the present disclosure now are described with reference to the attached drawings.

[1. Outline of Navigation System]

Figure 1:
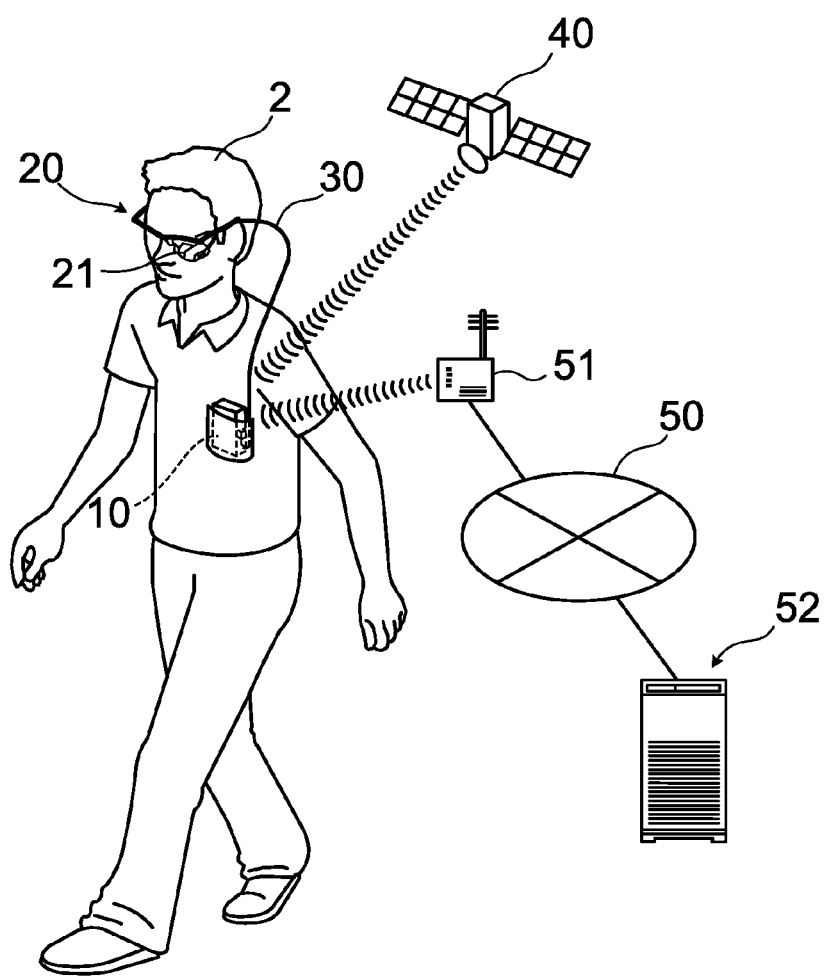
FIG. 1 is a schematic diagram depicting a navigation system.

FIG. 1 depicts an outline of a navigation system, which is an example of a position-related display system. The navigation system depicted in FIG. 1 may comprise a mobile phone 10, which is a mobile device, a head-mountable display ("HMD") 20, and a connection cable 30. The HMD 20 may be worn by a user 2 on the head., The connection cable 30 may be used to connect the HMD 20 and the mobile phone 10. In alternative, configurations, mobile phone 10 may be replaced by a mobile device other than a mobile phone and cable 30 may be replaced by a wireless connection, implemented by transmitters and receivers comprised in mobile phone 30 and HMD 20, for example, which may transmit wireless signals therebetween.

The mobile phone 10 may comprise the above-described UPS function and the above-described communication function. The UPS fraction may be used to acquire positional information about the mobile phone 10. The mobile phone 110 may determine positional information about the mobile phone 10 itself with the GPS function. The mobile phone 10 may acquire display content that may be based on the positional information by utilizing the communication function.

In the navigation system of FIG. 1, the display content may be, for example, map information. The mobile phone 10 may communicate with, for example, a UPS satellite 40 using the UPS function to determine the positional information about the mobile phone 10, such as, for example, a longitude and a latitude. The mobile phone 10 may acquire the map information within a certain range, based on the positional information determined with the UPS function, from an external server 52 connected to the Internet 50 via, for example, a relay station 51. The map information within the certain range may be, for example, the map information corresponding to locations within a range of 2 km in the directions of north, south, east, and west around a location corresponding to the positional information about the mobile phone 10. The range of the map information to be acquired may be arbitrarily varied based on input into the mobile phone 10. Even when the mobile phone 10 is moved, the acquisition of the map information based on the positional information about the mobile phone 110 may allow the map information based on the most recent positional information acquired after the movement, in certain configurations, the map information may not be acquired from the external server 52 connected to the Internet 50 via, the relay station 51. For example, the map information may be stored in advance in a storage device (not depicted), such as, for example, a memory card, or a hard disk drive ("HMD") in the mobile phone 10.

The user may use the HMD 20 to recognize visually an image generated on the basis of image information, such as the map information. The HMD 20 may be, for example, a see-through HMD. When the see-through HMD 20 is used, a polarization member, such as a half minor, a prism lens, or a hologram lens, each of which may be configured to transmit at least a portion of light external to the HMD 20, may be arranged in front of the user. The user may use the HMD 20, which is the see-through HMD, to visually recognize the image overlapped on an external scene (e.g., environmental objects in the user's line of sight). The HMD 20 may be, for example, a retinal-scanning HMD, in which laser light that is scanned may be incident on the eyes of the user. Alternatively, the HMD 20 may comprise a spatial light modulation element, such as an LCD or an organic light emitting display ("OLED"). In the retinal-scanning HMD, the laser light may comprise an intensity and a color corresponding to each pixel in an image corresponding to image information and may be emitted sequentially. The emitted laser light may be two-dimensionally scanned, The laser light that is two-dimensionally scanned may be projected onto the retina of one or more eye of the user wearing the HMD 20. In the HMD provided with the LCD as the spatial light modulation element, the image corresponding to the image information may be displayed on the LCD. The image displayed on the LCD may be formed on the retina of one or more eye of the user wearing the HMD 20. The HMD 20 may not be limited to the retinal-scanning HMD and the HMD provided with the LCD, but rather the HMD 20 may be selected from many varieties of HMDs that may be configured to display the image that corresponds to the image information, such as the map information, and that may be configured to display the image overlapping the external scene without blocking the view of the user 2.

The HMD 20 may connect to the mobile phone 10 via the connection cable 30, as described above. The connection cable 30 may be removable from the mobile phone 10. When using the navigation system depicted in FIG. 1, the mobile phone 10 may be connected to the HMD 20 via the connection cable 30. The connection between the mobile phone 10 and the HMD 20 via the connection cable 30 may allow the map information acquired by the mobile phone 10 to be transmitted to the HMD 20 via a mobile phone communication device 15 (depicted in FIG. 2), as described below, and the map information may be displayed on the HMD 20. The connection for communication between the HMD 20 and the mobile phone 10 may be via a wireless connection, such as, for example, Bluetooth communication, instead of the connection via the wired connection cable 30. The Bluetooth communication may be one of short-distance wireless communication technologies used for connection between, for example, mobile information devices that are apart from each other by several meters. Other known wireless connections may be suitable.

The mobile phone 10 may comprise means for acquiring first bearing information indicating an orientation of the mobile phone 10. The HMD 20 may comprise means for acquiring second bearing information indicating the orientation of the HMD 20. When the map information acquired by the mobile phone 10 is displayed in the mobile phone 10, mobile device map information on the basis of the first bearing information with respect to the mobile phone 10 may be displayed. In contrast, when the map information acquired by the mobile phone 10 is displayed on the HMD 20, head-mountable display map information ("HMD map information") based on the second bearing information indicating the orientation of the HMD 20 may be displayed, instead of the mobile device map information based on the first bearing information indicating the orientation of the mobile phone 10.

As described above, in the navigation system of FIG. 1, when the map information is viewed with the mobile phone 10, the mobile phone 10 may display, for example, the current position of the mobile phone 10 and the geography around the mobile phone 10 with the map information based on the orientation of the mobile phone 10. When the map information is viewed with the HMD 20, the mobile phone 10 may display, for example, the current position of the HMD 20 and the geography around the HMD 20 with the map information based on the orientation of the HMD 20.

[2. Configuration of Mobile Phone 10 and HMD 20]

Figure 2:
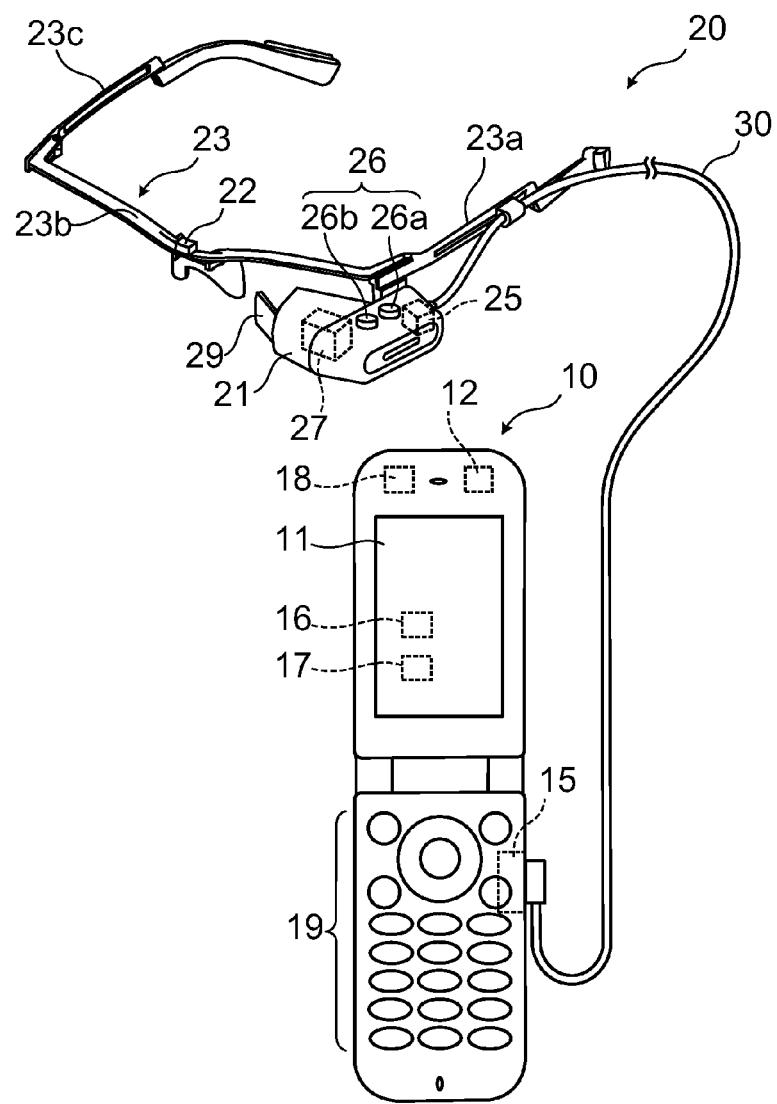
FIG. 2 is a schematic diagram depicting a mobile phone and a head-mountable display from the navigation system depicted in FIG. 1.
Figure 3:
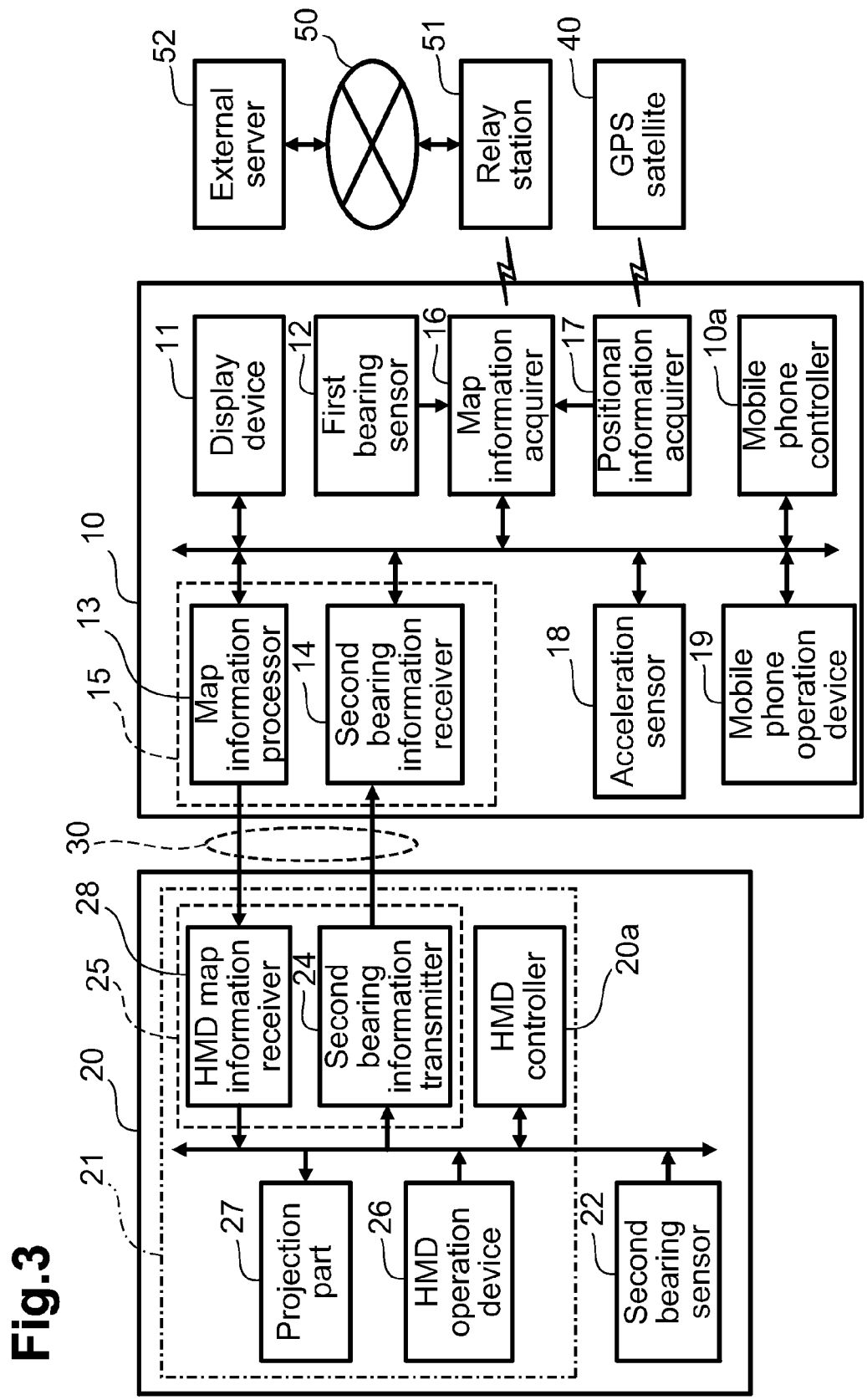
FIG. 3 is a block diagram depicting the configurations of the mobile phone and the head-mountable display from the navigation system depicted in FIG. 1.

FIG. 2 and FIG. 3 depict in detail the configurations of the mobile phone 10 and the HMD 20 in the navigation system depicted in FIG. 1. As depicted in FIG. 2, the mobile phone 10 may comprise a casing comprising, for example, a display device 11 on a side face and a casing comprising a mobile phone operation device 19 on another side face. The casings may be foldably attached to each other. As depicted in FIG. 2, the display device 11 may be made visible in a state in which both the casings are configured to be opened. As depicted in FIG. 3, the mobile phone 10 may comprise a first bearing sensor 12, a mobile phone communication device 15, a map information acquirer 16, a positional information acquirer 17, an acceleration sensor 18, and a mobile phone controller 10a. The mobile phone 10 may also have a well-known call function and a mail transmission and reception function.

The display device 11 may be, for example, a rectangular LCD. For example, the mobile device map information may be displayed on the display device 11. Information for executing the call function and the mail transmission and reception function may be displayed on the display device 11, in addition to the mobile device map information.

The first bearing sensor 12 may acquire the first bearing information indicating the direction of the mobile phone 10. The first bearing sensor 12 may be disposed at a certain position in the mobile phone 10. In the configuration in FIG. 2, the first bearing sensor 12 may be arranged at an upper right corner of the display device 11. In certain configurations, the first bearing sensor 12 may be disposed at other locations. The first bearing sensor 12 may be configured to detect the orientation of the long sides of the display device 11 (e.g., an orientation of a direction parallel to one or more of the long sides of mobile phone 10 relative to north, east, south, and west directions) as the orientation of the mobile phone 10 in a state in which the user holds the mobile phone 10 in a substantially horizontal position (e.g., horizontal with respect to gravity) to make the display device 11 visible. For example, a magnetic sensor may be used as the first bearing sensor 12. The magnetic sensor may be, for example, a compact and light-weight Magneto Impedance ("MI") sensor that may be installed in the mobile phone and that may use an MI effect of a magnetic body having a soft magnetic property.

The mobile phone communication device 15 may function as a mobile device side communication device. Specifically, the mobile phone communication device 15 may be used to transmit and receive a variety of data between the mobile phone 10 and the HMD 20. As depicted in FIG. 3, the mobile phone communication device 15 may comprise a map information processor 13 and a second bearing information receiver 14. The map information processor 13 may transmit the HMD map information generated in the mobile phone 10 to the HMD 20. The second bearing information receiver 14 may receive the second bearing information indicating the direction of the HMD 20 from the HMD 20. The data received by the second bearing information receiver 14 may comprise, for example, the operation states of a power ON-OFF button 26a and a display switching button 26b provided in the HMD 20 (described below) in addition to the second bearing information indicating the direction of the HMD 20. The data received by the second bearing information receiver 14 may also comprise, for example, the output state of laser light emitted from a projection part 27 in the HMD 20 (described below). The operation states of the power ON-OFF button 26a and the display switching button 26b provided in the HMD 20 may be the state detection means for detecting the state of one or more of the mobile phone 10 and the HMD 20. The output state of the laser light emitted from the projection part 27 in the HMD 20 may also be the state detection means for detecting the state of one or more of the mobile phone 10 and the HMD 20.

The positional information acquirer 17 may function as means for acquiring the positional information about the mobile phone 10. The positional information acquirer 17 may communicate with the GPS satellite 40 to determine, for example, the positional information about the mobile phone 10, such as a longitude and a latitude of the mobile phone 10. The positional information acquirer 17 may also function as movement detecting means for the mobile phone 10 (described below).

The map information acquirer 16 may acquire the map information based on the positional information about the mobile phone 10 determined by the positional information acquirer 17. The map information may be acquired from the external server 52 connected to the Internet 50 via the relay station 51. Alternatively, the map information acquirer 16 may read out, for example, the map information stored in advance in a storage device, such as a memory card or a built-in HDD, in the mobile phone 10 based on the positional information about the mobile phone 10, instead of acquiring the map information by the external communication.

The acceleration sensor 18 may function as the movement detecting means for the mobile phone 10. The acceleration sensor 18 may detect movement of the mobile phone 10 at an acceleration greater than a predetermined value. Start of movement from a stopped state or stop of movement from a moving state of the mobile phone 10 may be estimated based on the detected acceleration. In addition, a variation in the positional information acquired by the positional information acquirer 17 may be monitored for a predetermined time period. The start of movement and the stop from the moving state of the mobile phone 10 may be identified based on the result of the monitoring and the result of the detection of by the acceleration sensor 18 The acceleration sensor 18 may function as the movement detecting means for detecting that the position of the mobile phone 10 is moving based on the variation in the positional information acquired by the positional information acquirer 17 and the result of the detection by the acceleration sensor 18. Although the acceleration sensor 18 may function as the movement detecting means, the movement detecting means may not be limited to the acceleration sensor 18 and a speed sensor, for example, or other known movement detecting means, may be used.

The mobile phone operation device 19 may comprise various buttons used to operate the mobile phone 10. The various buttons may be operated to execute the call function and the mail transmission and reception function of the mobile phone 10. A certain operation with the mobile phone operation device 19 may activate the navigation system. Specifically, monitoring of the operation of the mobile phone operation device 19 may function as operation determining means for determining whether the mobile phone 10 is being operated.

The mobile phone controller 10a may control the entire mobile phone 10. The mobile phone controller 10a may comprise, for example, a central processing unit ("CPU") and a non-transitory, computer-readable memory, such as, for example, one or more of a read-only memory ("ROM") and a random access memory ("RAM") (not depicted), configured to store computer-readable instructions for instructing the controller to perform certain processes. The mobile phone controller 10a. may comprise an Application Specific Integrated Circuit ("ASIC") or a Field programmable Gate Array ("FPGA"). The CPU in the mobile phone controller 10a may read out a mobile device program stored in the ROM to execute a navigation process (depicted in FIG. 7 and described below). The execution of the navigation process by the CPU in the mobile phone controller 10a may cause the mobile phone controller 10a to generate the map information based on the positional information about the mobile phone 10 and the orientation of the mobile phone 10 or the orientation of the HMD 20.

The HMD 20 according to the present embodiment may comprise a mounting device 23 and a control device 21, as depicted in FIG. 2. The mounting device 23 may be a glass frame-type device configured to be worn by the user on the head. The control device 21 may project the image, which is generated based on the image information, such as the map information, toward the eyes of the user to display the image information overlapping the external scene. The mounting device 23 may comprise a left-side frame 23a and a right-side frame 23c configured to be worn by the user on the left and right ears, respectively, and a central frame 23b. The left-side frame 23a may be attached to the right-side frame 23c via the central frame 23b. Because the mounting device 23 may be formed of a glass frame type device in the above manner, the user may easily wear the HMD 20 on the head as if the HMD 20 were a pair of glasses.

A second bearing sensor 22 may be provided at a central position of the central frame 23b of the mounting device 23 as means for acquiring the second bearing information indicating the orientation of the HMD 20. The second bearing sensor 22 may be configured to detect the orientation of the HMD 20, which corresponds to the orientation of the front face of the head of the user when the user wears the HMD 20 on the head.

A magnetic sensor, such as a compact and light-weight MI sensor, may be used as the second bearing sensor 22 in a manner similar to the first bearing sensor 12 described above.

The control device 21 may be mountable to the left-side frame 23a of the mounting device 23 and may be positioned at a side of the left eye of the user. Alternatively, the control device 21 may be mountable to the right-side frame 23c of the mounting device 23 and may be positioned at a side of the right eye of the user (not depicted). The control device 21 may comprise a half minor 29. The laser light emitted from the control device 21 may be reflected from the half minor 29 and may be incident on the left or right eye of the user, as appropriate. As depicted in FIG. 3, the control device 21 may comprise an HMD communication device 25, a projection portion 27, an HMD operation device 26, and an HMD controller 20a.

The HMD communication device 25 may function as communication means at the side of the HMD 20. The HMD communication device 25 may comprise an HMD map information receiver 28 and a second bearing information transmitter 24. The HMD map information receiver 28 may receive the HMD map information transmitted from the mobile phone 10, The second bearing information transmitter 24 may transmit the second bearing information indicating the orientation of the HMD 20 relative to the mobile phone 10. The second bearing information transmitter 24 may transmit, for example, an operation state of the HMD operation device 26 (described below) to the mobile phone 10 in addition to the second bearing information. In addition, the second bearing information transmitter 24 may transmit, for example, an output state of the laser light emitted from the projection part 27 (described below) to the mobile phone 10.

The projection part 27 may project the image corresponding to the received HMD map information onto the eyes of the user, such that the image is overlapped on the external scene. The image overlapped on the external scene may be formed on the retina of the user when the projection part 27 projects the laser light for displaying the HMD map information onto an eye of the user.

The HMD operation device 26 may comprise a power ON-OFF button 26a and a display switching button 26b. The power ON-OFF button 26a may be used to turn on the power to use the HMD 20. The power ON-OFF button 26a may be also used to turn off the power to deactivate the HMD 20. The display switching button 26b may be used by the user to switch selectively between display and non-display of the image information, such as the HMD map information, on the HMD) 20. As described above, the display switching button 26b may be operated to not display the HMD map information or to display the HMD map information again, even when the HMD map information is configured to be displayed on the HMD 20.

The HMD controller 20a may control the HMD 20. The HMD controller 20a may comprise, for example, a CPU and a non-transitory, computer-readable memory, such as, for example, one or more of a ROM, and a RAM (not depicted), configured to store computer-readable instructions for instructing the controller to perform certain processes. The HMD controller 20a may comprise an ASIC or an FPGA. Specifically, the HMD controller 20a may control the second bearing information transmitter 24. The second bearing information transmitter 24 may acquire the second bearing information about the HMD 20 from the second bearing sensor 22 and transmit the acquired second bearing information to the mobile phone 10. The HMD controller 20a may control the projection part 27 to emit the received HMD map information to the eye of the user as the laser light. The HMD map information may be transmitted from the mobile phone 10 and be received by the HMD 20 via the HMD map information receiver 28. The CPU in the HMD controller 20a may be configured to execute, for example, an HMD map information displaying process (depicted in FIG. 8 and described below) in the above-described manner.

[3. Display Mode of Navigation System]

In the navigation system of FIG. 1 (described above), when the mobile phone 10 is used to confirm the map information, the mobile device map information based on the positional information about the mobile phone 10 and the first bearing information indicating the orientation of the mobile phone 10 in relation to the map information may be displayed on the display device 11, In contrast, when the HMD 20 is used to confirm the map information, the HMD map information based on the positional information about the mobile phone 10 and the second bearing information indicating the orientation of the HMD 20 in relation to one or more of the map information and the first bearing information may be displayed on the HMD 20. A difference in the display mode of the map information between when the user confirms the map information displayed on the display device 11 in the mobile phone 10 and when the user confirms the map information displayed on the HMD 20 will now be described with reference to FIG. 4 and FIG. 5.

Figure 4:
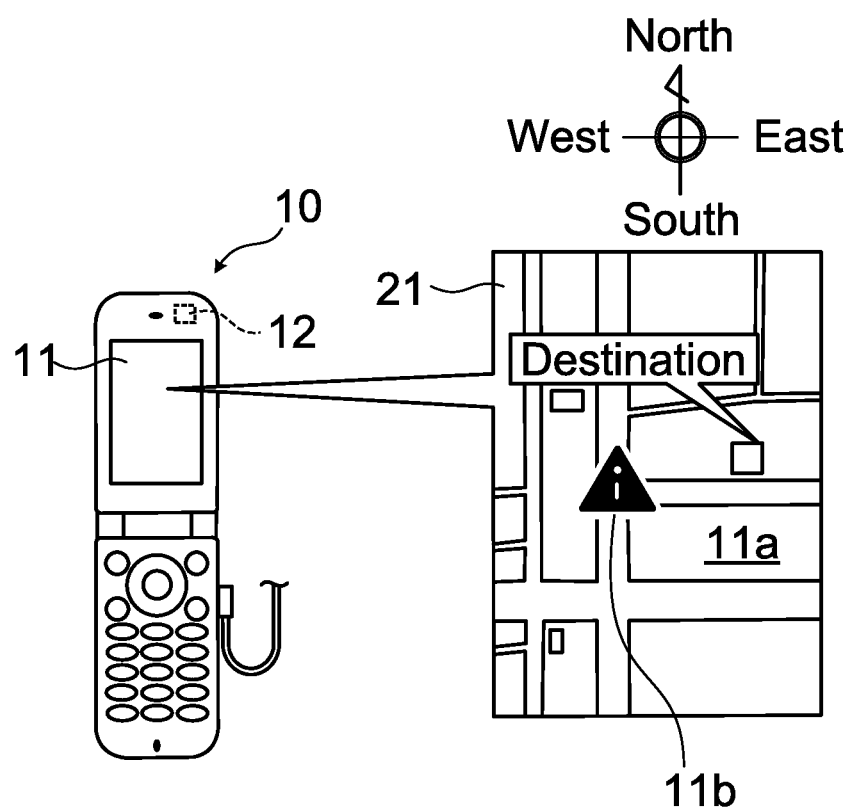
FIG. 4 is a schematic diagram depicting the mobile phone from the navigation system depicted in FIG. 1 and mobile device map information, which utilizes first bearing information based on the direction of the mobile phone.

When the user confirms the mobile device map information displayed on the display device 11 in the mobile phone 10, as depicted in FIG. 4, a map 11a may be displayed on the display device 11. The map 11a may be a map within a certain range substantially around the current positional information about the mobile phone 10. It may be assumed in FIG. 4 that the destination may be located in a direction east of the current position within the certain range. An icon 11b may be overlapped on the map 11a. The icon 11b may indicate the current positional information about the mobile phone 10 and the orientation of the mobile phone 10 in relation to the features on the map 11a. Because the mobile device map information with respect to the orientation of the mobile phone 10 is displayed on the display device 11 in the mobile phone 10 as described above, the orientation of the icon 11b on the mobile device map information may coincide with the orientation of the mobile phone 10 and may point in a direction which is the same as a pointing direction of the mobile phone 10. For example, when the orientation of the mobile phone 10 points in the north direction, the direction of the icon 11b on the mobile device map information may also point in the north direction.

Figure 5:
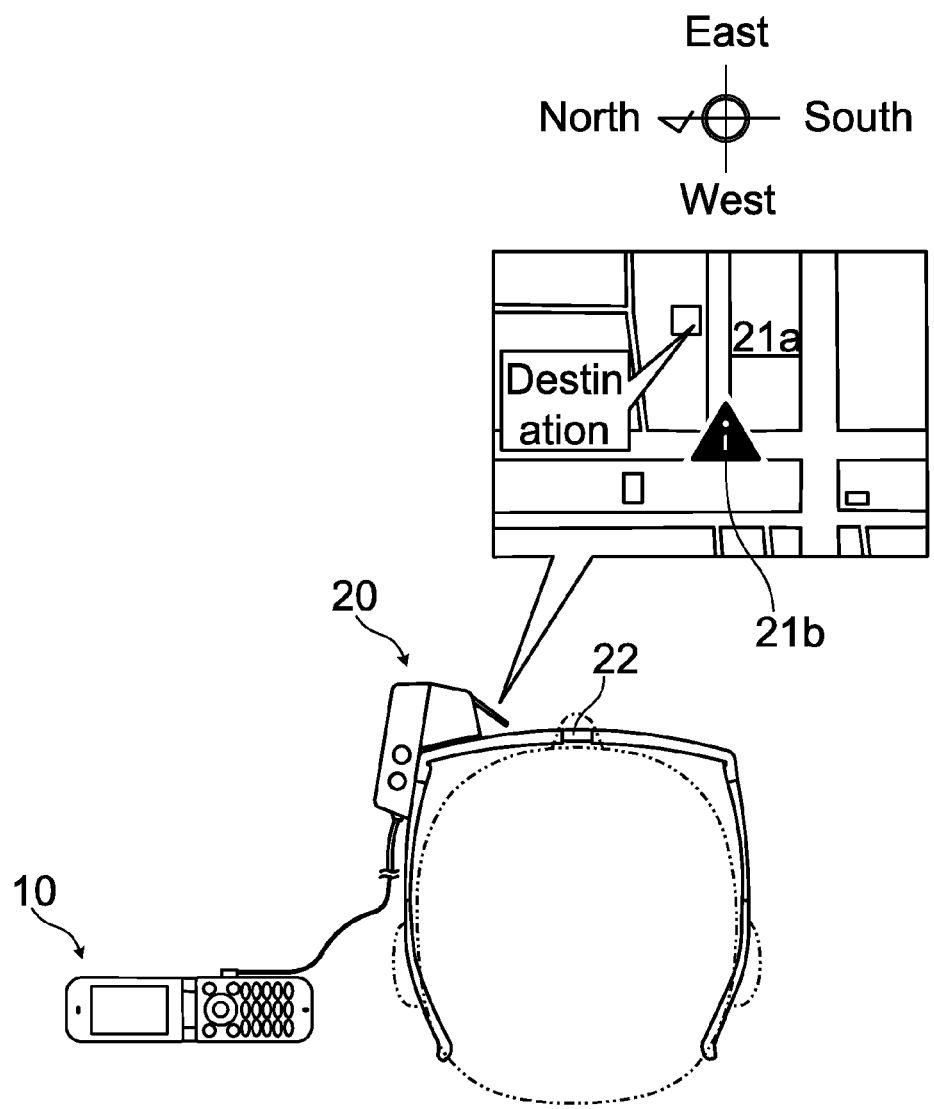
FIG. 5 is a schematic diagram depicting the head-mountable display from the navigation system depicted in FIG. 1 and head-mountable display map information, which utilizes second bearing information based on the direction of the head-mountable display.

On the other hand, when using the HMD 20 to confirm the HMD map information, as depicted in FIG. 5, a map 21a may be displayed on the HMD 20. The map 21a may be a map within a certain range substantially around the current positional information about the mobile phone 10. Specifically, the HMD map information with respect to the orientation of the HMD 20 may be displayed on the HMD 20. FIG. 5 depicts a state in which the user faces east. An icon 21b indicating the current positional information about the mobile phone 10 and the orientation of the HMD 20 may be overlapped on the map 21a in FIG. 5. The destination may be straight ahead of the current position on the map 21a, based on the orientation of the HMD 20.

When the user faces wearing the HMD 20 faces east, the orientation of the HMD 20 also may be directed to east. Accordingly, the orientation of the icon 21b on the HMD map information may point in the east direction, even when the orientation of the mobile phone 10 is points in the north direction, as depicted in FIG. 5. In other words, when the orientation of the mobile phone 10 is different from that of the HMD 20, the HMD map information with respect to the direction of the HMD 20 may be displayed on the HMD 20. Accordingly, it may not be necessary to pay attention to the direction of the mobile phone 10, and the mobile phone 10 may be stored in a pocket, a handbag, or another storage location while using the HMD 20.

In the example depicted in FIG. 5, the map 21*a* may be displayed such that east becomes the upward direction in the map displayed in the HMD 20, in accordance with the orientation of the HMD 20 and, correspondingly, the orientation of the user, as indicated by the orientation of the icon 21*b*. Specifically, the map 21*a* may be displayed in a state in which the map 11*a* on the mobile device map information depicted in FIG. 4 is rotated counterclockwise by 90° along with the rectangular display area. In other words, the map 11*a* may be displayed such that the pointing direction of the mobile phone 10 (e.g., east, south, west, or north) is the upward-pointing direction on the mobile device map information displayed on the display device 11 in the mobile phone 10. The map 21*a* may be displayed such that the pointing direction of the HMD 20 may be the upward-pointing direction on the HMD map information displayed on the HMD 20. Accordingly, it may be possible to easily confirm the current position of the user and the destination regardless of whether the mobile device map information or the HMD map information is used.

The orientations of the map 11*a* and the map 21*a* on the respective displays may not be varied in accordance with the directions of the mobile phone 10 and the HMD 20. For example, the map 11*a* and the map 21*a* may be displayed fixedly such that the north direction constantly is the upward-pointing direction and the orientation of each of the icon 11*b* and the icon 21*b* may be varied in accordance with the respective orientations of the mobile phone 10 and the HMD 20 to generate the mobile device map information and the HMD map information.

Figure 6A:
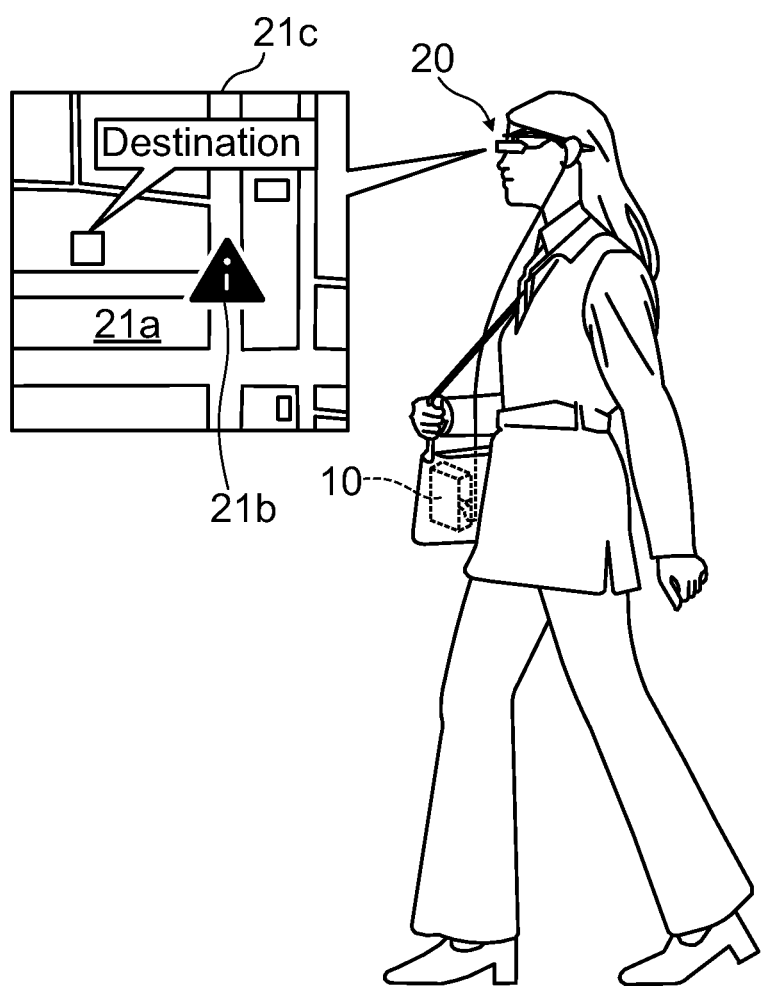
FIG. 6A is a schematic diagram depicting a display state of the map information on the head-mountable display.
Figure 6B:
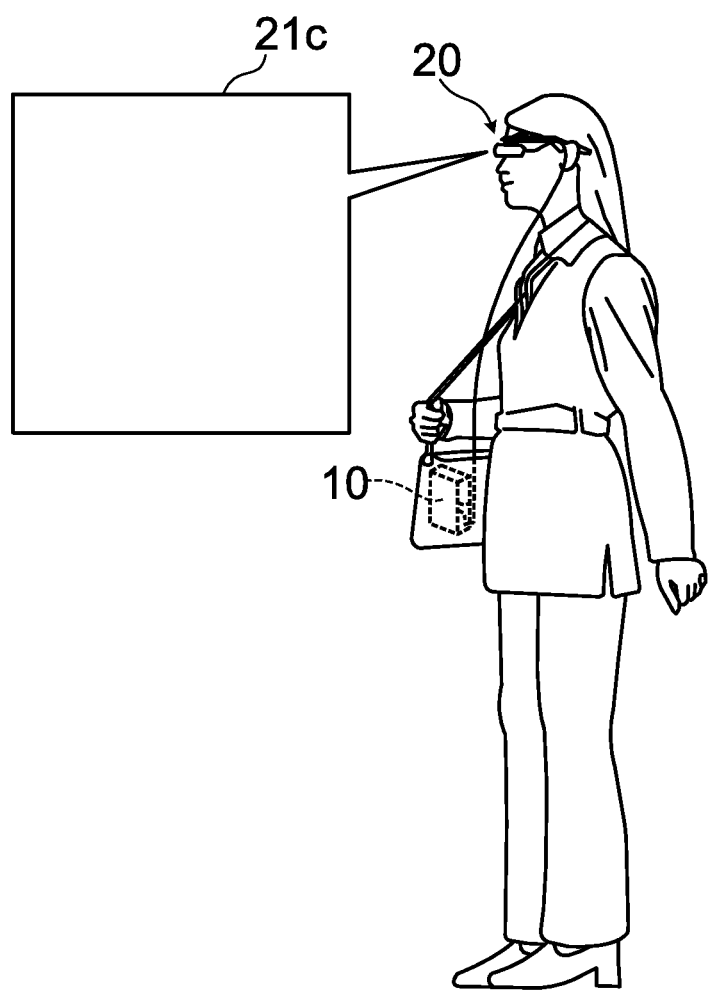
FIG. 6B is another schematic diagram depicting another display state of the map information on the head-mountable display.

The navigation system depicted in FIG. 1 may be configured such that, when the HMD 20 is operating, the HMD map information may be displayed on the HMD 20 only when it is detected that one or more of the HMD 20 and the mobile phone 10 are moving. An example of displaying the HMD map information on the HMD 20 when one or more of the HMD 20 and the mobile phone 10 are moving is described below, with reference to FIGS. 6A and 6B. FIGS. 6A and 6B depict an example of how the display of the HMD map information on the HMD 20 may be varied between a state when one or more of the HMD 20 and the mobile phone 10 are moving and a state when the HMD 20 and the mobile phone 10 are not moving.

When one or more of the HMD 20 and the mobile phone 10 are moving, as depicted in FIG. 6A, the map 21*a* and the icon 21*b* indicating the positional information about the mobile phone 10 and the direction of the HMD 20 may be displayed in a display area 21*c* for the HMD map information on the HMD 20 as the HMD map information. Accordingly, it may be possible for the user to move to the destination while confirming the HMD map information that is varied in accordance with the direction of the movement.

Nevertheless, the display of the HMD map information on the HMD 20 may be stopped when the user stops, as depicted in FIG. 6B. In other words, the display area 21*c* in which the HMD map information is displayed may be in the non-display state. In this case, the eye of the user may visualize the image of the actual scene around the user. As described above, the navigation system may display the HMD map information on the HMD 20 when one or more of the HMD 20 and the mobile phone 10 are moving. Consequently, for example, when the user stops to operate the mobile phone 10, it may be possible to prevent the HMD map information displayed on the HMD 20 from disturbing the user. When the HMD 20 and the mobile phone 10 stop moving, the mobile device map information may be displayed on the display device 11 in the mobile phone 10. Accordingly, the user may view the map information using the mobile phone 10, on an as-needed basis.

When one or more of the HMD 20 and the mobile phone 10 starts to move again, the map 21*a* and the icon 21*b* indicating the positional information about the mobile phone 10 and the orientation of the HMD 20 may be displayed on the display area 21*c* again as the HMD map information, as depicted in FIG. 6A.

The acceleration sensor 18 and the positional information acquirer 17 may be used to detect the movement and the stopping of the mobile phone 10, as described above. Specifically, when the acceleration sensor 18 detects that an acceleration of the mobile phone 10 is greater than a predetermined value, it may be possible to estimate that the mobile phone 10 has changed from the stop state to the movement state or from the movement state to the stop state. Then, when the acceleration sensor 18 detects that an acceleration of the mobile phone 10 is greater than the predetermined value and the positional information acquirer 17 detects that the positional information is varied in a predetermined time period, it may be determined that the mobile phone 10 has started to move from the stop state. When the positional information is not varied in the predetermined time period, it may be determined that the mobile phone 10 has transitioned from the movement state to the stop state.

[4. Control Processes in Mobile Phone 10 and HMD 20]

Control processes executed by the mobile phone 10 and the HMD 20 in the navigation system described above now are described with reference to FIG. 7 and FIG. 8.

The navigation process executed by the mobile phone controller 10*a* in the mobile phone 10 now is described with reference to FIG. 7. When the mobile phone controller 10*a* comprises the CPU, the navigation process may be executed by the CPU. The navigation process may be executed when a certain operation is performed with the mobile phone operation device 19 in the mobile phone 10.

Referring to FIG. 7, at S101, the mobile phone controller 10*a* may communicate with multiple GPS satellites 40 with the positional information acquirer 17 to acquire the positional information, such as a longitude and a latitude. The positional information about the mobile phone 10 may be determined from the acquired positional information. At S102, the mobile phone controller 10*a* may acquire the map information based on the positional information about the mobile phone 10 with the map information acquirer 16 from the external server 52 connected to the Internet 50 via the relay station 51 or from a storage device in the mobile phone 10. In the process of S102, for example, the positional information about the mobile phone 10 determined by the positional information acquirer 17 and a certain range of the map information may be transmitted to the external server 52 connected to the Internet 50 via the map information acquirer 16. The external server 52 or the storage device in the mobile phone 10 may generate the map information corresponding to the certain range substantially around the received positional information about the mobile phone 10 and may transmit the generated map information to the map information acquirer 16. The map information received in the above-described manner may be displayed in, for example, the display device 11 in the mobile phone 10 as the map 11*a* (depicted in FIG. 4).

At S103, the mobile phone controller 10a may determine whether the second bearing information is received from the HMD 20. When the mobile phone controller 10a determines that the second bearing information is not received from the HMD 20 (S103: NO), the process may proceed to S110. When the mobile phone controller 10a determines that the second bearing information is received from the HMD 20 (S103: YES), the process may proceed to S104.

At S103, the mobile phone controller 10a may determine whether the second bearing information indicating the orientation of the HMD 20 transmitted from the second bearing information transmitter 24 in the HMD 20 (depicted in FIG. 3) is received by the second bearing information receiver 14 in the mobile phone 10 (depicted in FIG. 3). The reception of the second bearing information from the HMD 20 during the navigation process may allow the mobile phone 10 to acquire the most recent orientation of the HMD 20 and, correspondingly, the orientation of the user. In addition, the reception of the second bearing information from the HMD 20 may indicate that the HMD 20 is connected to the mobile phone 10 via the connection cable 30 or via a wireless connection.

At S104, the mobile phone controller 10a may acquire information regarding the operation state of the mobile phone operation device 19 and may proceed to S105 thereafter. At S105, the mobile phone controller 10a may determine whether the mobile phone operation device 19 currently is being operated. When the mobile phone controller 10a determines that the mobile phone operation device 19 currently is being operated (S105: YES), the process may proceed to S110, When the mobile phone controller 10a determines that the mobile phone operation device 19 currently is not being operated (S105: NO), the process may proceed to S106.

At Step S106, the mobile phone controller 10a may confirm the display state on the HMD 20 to determine whether the HMD map information may be displayed on the HMD 20. When the mobile phone controller 10a determines that the HMD map information may be displayed on the HMD 20 (S106: YES), the process may proceed to S107. When the mobile phone controller 10a determines that the HMD map information may not be displayed on the HMD 20 (S106: NO), the process may proceed to S110.

The display state of the HMD 20 determined at Step S106 may correspond to, for example, the operation state of the display switching button 26b in the HMD 20. The operation state of the display switching button 26b in the HMD 20 may be received along with the second bearing information from the HMD 20. Alternatively or additionally, the display state of the HMD 20 determined at S106 may correspond to, for example, the output state of the laser light emitted from the projection part 27. Specifically, when the mobile phone controller 10a detects that the display switching button 26b is set to the non-display state or that the output of the laser light is set to a decreased state, the mobile phone controller 1.0a may determine that the HMD map information may not be displayed on the HMD 20.

At S107, the mobile phone controller 10a may determine whether the mobile phone 10 is moving. When the mobile phone controller 10a determines that the mobile phone 10 is not moving (S107: NO), the process may proceed to S110. When the mobile phone controller 10a determines that the mobile phone 10 is moving (S107: YES), the process may proceed to S108.

The determination of whether the user of the mobile phone 10 is moving at S107 may be performed by, for example, the acceleration sensor 18 and the positional information acquirer 17 in the mobile phone 10. Specifically, when the acceleration sensor 18 detects that the mobile phone 10 moves at an acceleration or deceleration greater than a predetermined value, it may be estimated that the mobile phone 10 transitions from the stop state to the movement state or from the movement state to the stop state. When the positional information acquirer 17 detects that the positional information is varied in a predetermined time period, it may be determined that the mobile phone 10 starts to move from the stop state. When the positional information is not varied in the predetermined time period, it may be determined that the mobile phone 10 makes a transition from the movement state to the stop state.

At S108, the mobile phone controller 10a may generate the HMD map information based on the second bearing information received from the HMD 20, the positional information acquired by the positional information acquirer 17, and the map information acquired by the map information acquirer 16, and the process may proceed to S109. At S109, the mobile phone controller 10a may transmit the HMD map information generated at S108 to the HMD 20 via the map information processor 13. The icon 21b indicating the direction corresponding to the orientation of the HMD 20 may be displayed as the HMD map information, as depicted in FIG. 5. Subsequently, the process may proceed to S112.

At S110, the mobile phone controller 10a may acquire the first bearing information indicating the orientation of the mobile phone 10 with the first bearing sensor 12. The mobile phone controller 10a may generate the mobile device map information (depicted in FIG. 4) based on the acquired first bearing information, the positional information acquired by the positional information acquirer 17, and the map information acquired by the map information acquirer 16, and the process may proceed to S111. At S111, the mobile phone controller 10a may display the mobile device map information generated at S110 on the display device 11. Subsequently, the process may proceed to S112.

At S112, the mobile phone controller 10a may determine whether to turn off the navigation system. When the mobile phone controller 10a determines to turn off the navigation system (S112: YES), the navigation process may be terminated. When the mobile phone controller 10a determines not to turn off the navigation system (S112: NO), the process may return to S101.

The HMD map information displaying process executed by the HMD controller 20a now is described with reference to FIG. 8. When the HMD controller 20a comprises the CPU, the HMD map information displaying process may be executed by the CPU. The HMD map information displaying process may be executed when the mobile phone 10 connects with the HMD 20 via one or more of the connection cable 30 and a wireless connection, and the HMD 20 is turned on.

Referring to FIG. 8, at S201, the HMD controller 20a may determine whether the HMD 20 is connected to the mobile phone 10 via one or more of the connection cable 30 and a wireless connection. When the HMD controller 20a determines that the HMD 20 is connected to the mobile phone 10 via one or more of the connection cable 30 and a wireless connection (S201: YES), the process may proceed to S202. When the HMD controller 20a determines that the HMD 20 is not connected to the mobile phone 10 (S201: NO), the process may proceed to S207.

At S201, the connection between the HMD 20 and the mobile phone 10 may be determined, for example, in the following manner. When the mobile phone controller 10a detects a connection between the HMD 20 and the mobile phone 10 (S201: YES), the mobile phone controller 10a may submit a transmission request for the second bearing information to the HMD 20 via the mobile phone communication device 15 in the mobile phone 10. When the transmission request for the second bearing information is received by the HMD communication device 25, the HMD 20 may determine that the HMD 20 is connected to the mobile phone 10.

At S202, the HMD controller 20a may acquire the second bearing information indicating the orientation of the HMD 20 from the second bearing sensor 22 in the HMD 20, and the process may proceed to S203. At S203, the HMD controller 20a may transmit the acquired second bearing information to the mobile phone 10 via the second bearing information transmitter 24.

At S203, the HMD controller 20a also may transmit information about one or more of the operation state of the display switching button 26b in the HMD 20 and the output state of the laser light emitted from the projection part 27 via the second bearing information transmitter 24. Subsequently, the process may proceed to S204.

At S204, the HMD controller 20a may perform a reception waiting process. In the reception waiting process, the HMD controller 20a may wait for the reception of the HMD map information from the mobile phone 10. After the second bearing information and the display state of the HMD 20 are transmitted to the mobile phone 10, the HMD controller 20a may wait a predetermined time for the reception of the HMD map information. After the predetermined time has elapsed, the process may proceed to S205. Alternatively, the process may proceed to S205 immediately after reception of the HMD map information at the HMD 20.

At S205, the HMD controller 20a may determine whether the HMD map information transmitted from the mobile phone 10 has been received by the HMD 20. When the HMD controller 20a determines that the HMD map information has not been received by the HMD 20 (S205: YES), the process may proceed to S206. When the HMD controller 20a determines that the HMD map information has not been received by the HMD 20 (S205: NO), the process may proceed to S207.

At S206, the HMD controller 20a may display the HMD map information received from the mobile phone 10 on the HMD 20. Specifically, the HMD map information may be emitted from the projection part 27 toward the eye of the user as image light, such that the HMD map information may be visible to the user. Then, the process may proceed to S208.

At S207, the HMD controller 20a may turn off the image display of the HMD map information on the HMD 20. Specifically, when the HMD controller 20a determines that the HMD 20 is not connected to the mobile phone 10 (S201: NO) or the the HMD map information has not been received in a predetermined time period (S205: NO), the display of the HMD map information may be stopped. Subsequently, the process may proceed to S208.

At S208, the HMD controller 20a may determine whether the power ON-OFF button 26a in the HMD operation device 26 is operated to turn off the power of the HMD 20. When the HMD controller 20a determines that the power of the HMD 20 is turned off (S208: YES), the HMD map information displaying process may be terminated. When the HMD controller 20a determines that the power of the HMD 20 is not turned off (S208: NO), the process may return to S201.

As described above, the HMD map information corresponding to the orientation of the HMD 20 may be displayed on the HMD 20 when the mobile phone 10 is connected to the HMD 20 via the connection cable 30 or a wireless connection. Accordingly, the current position of the HMD 20 and the destination from the HMD map information generated based on the orientation of the HMD 20 may be displayed without regard to the orientation of the mobile phone 10.

In addition, a setting of one of a HMD display state and a HMD non-display state, in which the HMD 20 displays or does not display, respectively, the HMD map information may be selected. Accordingly, for example, in an emergency or when the HMD 20 reaches the destination, it may be sufficient to set the HMD map information on the HMD 20 to the non-display state. Therefore, it may not be necessary to remove the HMD 20 worn by the user on the head or to disconnect the connection cable 30 or the wireless connection to make the HMD map information invisible.

Furthermore, the mobile phone 10 may comprise the acceleration sensor 18 used to detect a moving state and a stop state of the mobile phone 10, The acceleration sensor 18 and the positional information acquirer 17 may be used to identify the movement state or the stop state of the mobile phone 10. When it is detected that the mobile phone 10 transitions from the movement state to the stop state, the transmission of the HMD map information from the mobile phone 10 to the HMD 20 may be stopped, and the display of the HMD map information may be turned off on the HMD 20. When it is detected that the mobile phone 10 transitions from the stop state to the movement state, the transmission of the HMD map information from the mobile phone 10 to the HMD 20 may be restarted and the HMD map information may be displayed on the HMD 20.

Although the map information displayed on the display device 11 in the mobile phone 10 and on the HMD 20 is described as a two-dimensional planar map, the map information may not be limited to this. For example, the map information may be displayed as a bird's eye view or a panoramic three-dimensional map. Alternatively, a two-dimensional planar map may be displayed in the mobile phone 10 and a bird's eye view or a panoramic three-dimensional map may be displayed on the HMD 20 or vice versa. The display mode in the mobile phone 10 may be differentiated from that on the HMD 20 in the above manner. Alternatively, one or more of the HMD 20 and the mobile phone 10 may selectively display desired map information based on input at the mobile phone operation unit 19 or elsewhere. When a bird's eye view or a panoramic three-dimensional map is displayed as the map information, the icon 11b or 21b corresponding to the current position or the direction of the user may not be displayed.

Although the maps 11a and 21a and the icons 11b and 21b are displayed as the map information in the present embodiment, the map information may not be limited to the maps 11a and 21a and the icons 11b and 21b. For example, a route to the destination may be displayed on the maps 11a and 21a.

The navigation system may be configured as the position-related display system described above. Nevertheless, another position-related display system may be used as long as display content is acquired based on the positional information about the mobile phone 10. For example, an Augmented Reality ("AR") system may be used as the position-related display system. The AR system, for example, may acquire information about facilities around the mobile phone 10, rather than or in addition to map information, and the navigation system may use the information about the facilities as the display content, and may display the information about facilities in accordance with the orientation of one of the mobile phone 10 and the HMD 20.

In the above-described navigation system, the mobile phone 10 may be moving to a certain position and the HMD 20 may display the HMD map information generated on the basis of the positional information about the mobile phone 10 and the second bearing information indicating the orientation of the HMD 20. In addition, in the above-described navigation system, the mobile phone 10 may be moving to a certain position and one or more of the HMD 20 and the mobile phone 10 may display one or more of the device map information and the HMD map information displayed based on the variation in the usage state of one or more of the mobile phone 10 and the HMD 20. Furthermore, in the above-described navigation system, the mobile phone 10 arbitrarily may display the mobile device map information on the display device 11 while the HMD map information is being displayed on the HMD 20.

Furthermore, in the above-described navigation system, for example, even though the HMD map information may not be displayed on the HMD 20 under certain conditions the HMD 20 is the off state or the HMD 20 is not connected to the mobile phone 10), it may be possible to view the mobile device map information on the mobile phone 10, such that functionality of the navigation system may be realized.

Furthermore, in the above-described navigation system, it may be possible to display the HMD map information on the HMD 20, for example, when the HMD 20 is moving.

Furthermore, in the above-described navigation system, the connection between the mobile phone 10 and the HMD 20 may allow the HMD map information to be displayed on the HMD 20.

Furthermore, in the above-described navigation system, for example, the installation of the mobile device program in the mobile phone may allow the HMD map information to be displayed on the HMD 20.

While the invention has been described in connection with various exemplary structures and illustrative embodiments, it will be understood by those skilled in the art that other variations and modifications of the structures, configurations, and embodiments described above may be made without departing from the scope of the invention. For example, this application comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. Other structures, configurations, and embodiments consistent with the scope of the claimed invention will be apparent to those skilled in the art from a consideration of the specification or practice of the invention disclosed herein. It is intended that the specification and the described examples are illustrative with the true scope of the invention being defined by the following claims.

What is claimed is:

1. A system comprising:
a head-mountable display; and
a mobile device, the mobile device comprising:
    a first processor; and
    a first memory configured to store first computer-readable instructions therein, wherein the first computer-readable instructions instruct the first processor to execute processes comprising:
        acquiring positional information that indicates a position of the mobile device;
        acquiring first orientation information that indicates an orientation of the mobile device with respect to a reference direction;
        displaying content based on the positional information and the first orientation information on the mobile device when a particular condition is satisfied;
        receiving from the head-mountable display second orientation information that indicates an orientation of the head-mountable display with respect to one or more of the reference direction and the orientation of the mobile device; and
        transmitting to the head-mountable display content based on the positional information and the second orientation information when the particular condition is not satisfied.

2. The system according to the claim 1, wherein the head-mountable display comprises:
a second processor;
a second memory configured to store second computer-readable instructions therein, wherein the second computer-readable instructions instruct the second processor to execute processes comprising:
    acquiring the second orientation information;
    transmitting the second orientation information to the mobile device;
    receiving the content based on the positional information and the second orientation information from the mobile device; and
    displaying the received content based on the positional information and the second orientation information on the head-mountable display.

3. The system according to the claim 1, wherein the first computer-readable instructions further instruct the first processor to execute processes comprising:
determining an operational state of one or more of the mobile device and the head-mountable display;
determining whether to display the content based on the positional information and the first orientation information or content based on the positional information and the second orientation information, according to the determined operational state of the one or more of the mobile device and the head-mountable display.

4. The system according to the claim 3,
wherein determining the operational state of the one or more of the mobile device and the head-mountable display comprises determining whether the mobile device is currently being operated, and
wherein the first computer-readable instructions further instruct the first processor to execute processes comprising:
    determining that the particular condition is satisfied when the first processor determines that the mobile device is currently being operated;
    determining that the particular condition is not satisfied when the first processor determines that the mobile device is not currently being operated; and
    preventing transmission to the head-mountable display of the content based on the positional information and the second orientation information when the particular condition is satisfied.

5. The system according to the claim 3,
wherein determining the operational state of the one or more of the mobile device and the head-mountable display comprises determining whether the head-mountable display is able to display the content based on the positional information and the second orientation information thereon, and
wherein the first computer-readable instructions further instruct the first processor to execute processes comprising:
    determining that the particular condition is satisfied when the first processor determines that the head-mountable display is not able to display the content based on the positional information and the second orientation information thereon;

determining that the particular condition is not satisfied when the first processor determines that the head-mountable display is able to display the content based on the positional information and the second orientation information thereon; and preventing transmission to the head-mountable display of the content based on the positional information and the second orientation information when the particular condition is satisfied.

6. The system according to the claim 3, wherein the first computer-readable instructions further instruct the first processor to execute processes comprising:

determining whether the mobile device is moving; and determining that the particular condition is not satisfied when the first processor determines that the mobile device is moving.

7. The system according to the claim 6, wherein the first computer-readable instructions further instruct the first processor to implement steps comprising:

determining that the particular condition is satisfied when the first processor determines that the mobile device is not moving; and preventing transmission to the head-mountable display of the content based on the positional information and the second orientation information when the particular condition is satisfied.

8. The system according to the claim 1, wherein the system is a navigation system and one or more of the mobile device and the head-mountable device is configured to display content comprising map information based on the positional information.

9. A mobile device comprising:

a processor; and a memory configured to store computer-readable instructions therein, wherein the computer-readable instructions instruct the processor to execute processes comprising:

acquiring positional information indicative of a position of the mobile device;

acquiring first orientation information that indicates an orientation of the mobile device with respect to a reference direction;

displaying content based on the positional information and the first orientation information on the mobile device when a particular condition is satisfied;

receiving second orientation information that indicates an orientation of a head-mountable display with respect to one or more of the reference direction and the orientation of the mobile device; and transmitting to the head-mountable display content based on the positional information and the second orientation information when the particular condition is not satisfied.

10. The mobile device according to the claim 9, wherein the computer-readable instructions further instruct the processor to execute processes comprising:

acquiring the second orientation information;

generating content based on the positional information and the second orientation information;

transmitting the content based on the positional information and the second orientation information to the head-mountable device, such that the head-mountable display displays the received content based on the positional information and the second orientation information on the head-mountable display.

11. The system according to the claim 9, wherein the computer-readable instructions further instruct the processor to execute processes comprising:

determining an operational state of the mobile device;

determining whether to display the content based on the positional information and the first orientation information or content based on the positional information and the second orientation information, according to the determined operational state of the mobile device.

12. A non-transitory, computer-readable storage medium storing computer readable instructions that, when executed, instruct a processor of a mobile device to execute processes comprising:

acquiring positional information indicative of a position of the mobile device;

acquiring first orientation information that indicates an orientation of the mobile device with respect to a reference direction;

displaying content based on the positional information and the first orientation information on the mobile device when a particular condition is satisfied;

receiving second orientation information that indicates an orientation of a head-mountable display with respect to one or more of the reference direction and the orientation of the mobile device; and transmitting to the head-mountable display content based on the positional information and the second orientation information when the particular condition is not satisfied.

13. The non-transitory, computer-readable storage medium according to the claim 12, wherein the computer readable instructions further instruct a processor of a mobile device to execute processes comprising:

acquiring the second orientation information;

generating content based on the positional information and the second orientation information;

transmitting the content based on the positional information and the second orientation information to the head-mountable device, such that the head-mountable display displays the received content based on the positional information and the second orientation information on the head-mountable display.

14. The non-transitory, computer-readable storage medium according to the claim 12, wherein the computer readable instructions further instruct a processor of a mobile device to execute processes comprising:

determining an operational state of one or more of the mobile device and the head-mountable display;

determining whether to display the content based on the positional information and the first orientation information or content based on the positional information and the second orientation information, according to the determined operational state of the one or more of the mobile device and the head-mountable display.

15. A system comprising:

a head-mountable display; and a mobile device, the mobile device comprising:

a position acquisition device configured to acquire positional information that indicates a position of the mobile device;

a first orientation acquisition device configured to acquire first orientation information that indicates an orientation of the mobile device with respect to a reference direction;

a first display configured to display content based on the positional information and the first orientation information on the mobile device when a particular condition is satisfied;

a first receiver configured to receive from the head-mountable display second orientation information that indicates an orientation of the head-mountable display with respect to one or more of the reference direction and the orientation of the mobile device; and a first transmitter configured to transmit to the head-mountable display content based on the positional information and the second orientation information when the particular condition is not satisfied.

16. The system according to the claim 15, wherein the head-mountable display comprises:

a second orientation acquisition device configured to acquire the second orientation information;

a second transmitter configured to transmit to the mobile device the second orientation information;

a second receiver configured to receive from the mobile device the content based on the positional information and the second orientation information; and a second display configured to display the received content based on the positional information and the second orientation information on the head-mountable display.

17. The system according to the claim 15, wherein the mobile device further comprises:

an operational state determining device configured to determine an operational state of one or more of the mobile device and the head-mountable display;

a content display determining device configured to determine whether to display the content based on the positional information and the first orientation information or content based on the positional information and the second orientation information, according to the operational state of the one or more of the mobile device and the head-mountable display determined by the operational state determining device.

18. The system according to the claim 2, wherein the head-mountable display further comprises:

a bearing sensor configured to acquire second bearing information indicating an orientation of the head-mountable display, wherein acquiring the second orientation information comprises acquiring the second orientation information from the bearing sensor.

* * * * *